United States Patent [19]

Lange et al.

[11] 4,384,861
[45] May 24, 1983

[54] UNIVERSAL JOINT SHAFT, PARTICULARLY FOR A STEERING COLUMN OF MOTOR VEHICLES

[75] Inventors: Günther Lange; Hans Hucklenbroich, both of Damme; Jürgen Ulderup, Stemwede, all of Fed. Rep. of Germany

[73] Assignee: Firma LWM Lemförder Gelenkwellen GmbH, Fed. Rep. of Germany

[21] Appl. No.: 193,437

[22] Filed: Oct. 3, 1980

[30] Foreign Application Priority Data

Oct. 10, 1979 [DE] Fed. Rep. of Germany ....... 2941065
Feb. 26, 1980 [DE] Fed. Rep. of Germany ....... 3007039

[51] Int. Cl.³ .......................... F16C 3/03; F16D 3/06
[52] U.S. Cl. ..................................... 464/168; 464/169
[58] Field of Search .............. 308/6 C; 403/321, 322, 403/330; 464/162, 167, 168, 169

[56] References Cited

U.S. PATENT DOCUMENTS

| 3,123,990 | 3/1964 | Freeman | 64/23 |
| 3,325,837 | 6/1967 | Hartmann | 64/23 X |
| 3,940,948 | 3/1976 | Schultenkamper | 64/23 X |
| 3,995,916 | 12/1976 | Lange et al. | 308/6 C |
| 4,075,872 | 2/1978 | Geisthoff | 64/23 X |
| 4,103,514 | 8/1978 | Grosse-Entrup | 64/23.7 |
| 4,125,000 | 11/1978 | Grob | 64/23 |
| 4,133,190 | 1/1979 | Schuller | 64/23.7 |
| 4,162,618 | 7/1979 | Okuda | 64/23 |

FOREIGN PATENT DOCUMENTS 2209170 2/1979 Fed. Rep. of Germany .

Primary Examiner—John M. Jillions
Assistant Examiner—Daniel P. Stodola
Attorney, Agent, or Firm—McGlew and Tuttle

[57] ABSTRACT

The universal joint shaft, particularly for a steering column of a motor vehicle, includes a tubular outer shaft, a tubular inner shaft slidably mounted in the outer shaft for axial telescoping movement relative to the outer shaft and engageable for rotation therewith, a bearing between the inner and outer shafts, and a guide tube member between the inner and outer shafts for guiding the inner shaft relative to the outer shaft and transmitting torque between the inner and outer shafts.

16 Claims, 2 Drawing Figures

UNIVERSAL JOINT SHAFT, PARTICULARLY FOR A STEERING COLUMN OF MOTOR VEHICLES

FIELD AND BACKGROUND OF THE INVENTION

The invention generally relates to a universal joint shaft, and, more particularly, to a new and useful universal joint shaft having telescoping parts which are engageable with each other in the direction of rotation, and advantageously usable as steering shaft for motor vehicles and in which, preferably, an anti-friction bearing is provided for axial guidance and torque transmission.

Shafts of this kind are known and various designs thereof are described and shown, for example, in West German Pat. No. 22 09 170 and West German Offenlegunsschrift No. 25 38 686. Such shafts are typically provided, on both ends with a universal joint which acts as a connecting member to driving and driven mechanisms. The universal joints are either welded or screw connected to the shaft. Screwed connections are preferred since the option of unscrewing facilitates the mounting and dismounting of the shaft. However, prior art shafts of this design are disadvantageous insofar as with a given overall length in mounted position, the simultaneously required extension cannot be obtained.

SUMMARY OF THE INVENTION

The invention is directed to a universal joint shaft, particularly for a steering column of motor vehicles having the capacity for being widely extended, while having a small length in mounted position, which is usable particularly in commercial tilting-type vehicles. At the same time, the shaft is simple in design and economical to manufacture.

In accordance with an embodiment of the invention, an arrangement is provided which ensures a mutually secure locking of the shaft parts over the range of their displacements.

In accordance with the invention, a universal joint shaft, particularly for a steering column of a motor vehicle, includes a tubular outer shaft, a tubular inner shaft slidably mounted in the outer shaft for axial telescoping movement relative to the outer shaft and engageable for rotation therewith, bearing means between the inner and outer shafts, and guide means between the inner and outer shafts for guiding the inner shaft relative to the outer shaft and transmitting torque between said inner and outer shafts.

In accordance with a preferred embodiment of the invention, the guide means includes a tubular guide tube and the inner shaft comprises two separate shaft portions concentrically received within the guide tube. The bearing means is preferably mounted to a first one of the shaft portions and the second one of the shaft portions is axially displaceable in the guide tube.

In accordance with a further preferred embodiment of the invention, locking means are provided for locking the guide tube to the outer shaft. The locking means preferably comprises a bearing ring mounted intermediate the guide tube and the outer shaft, a resilient ring operatively interconnecting the first and second ones of the shaft portions, and at least one of the resilient ring and bearing ring including means for detachably connecting the resilient ring to the bearing ring.

Accordingly, it is an object of the invention to provide a universal joint shaft which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION

Figure 1:
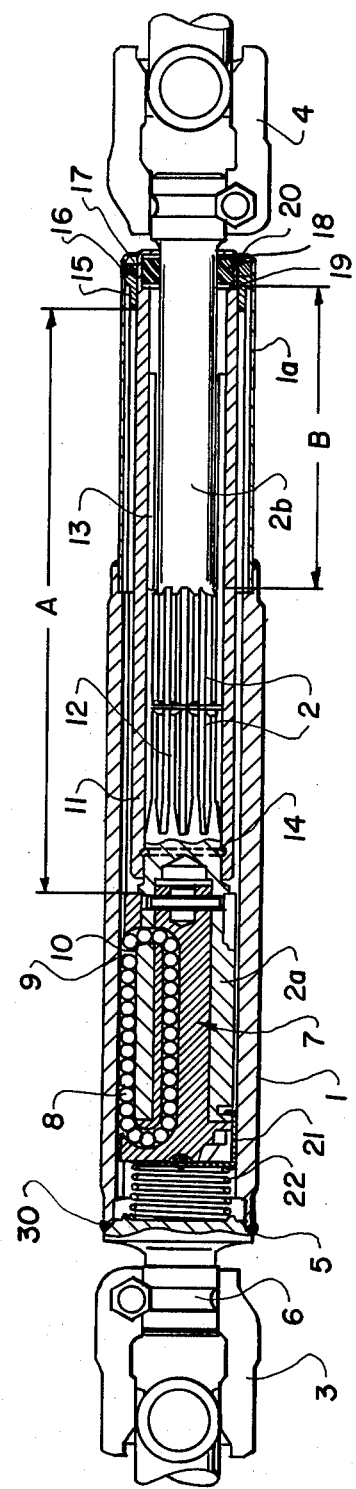
FIG. 1 is a side sectional view of a universal joint shaft constructed in accordance with an embodiment of the invention; an FIG. 2 is a side sectional view of another embodiment of the invention including means for locking a guide tube to the outer shaft.

Referring now to the drawings, in particular wherein like reference characters designate like or corresponding parts throughout the views, there is shown a universal joint shaft in accordance with the invention.

In FIG. 1, the universal joint shaft is composed of an elongated outer shaft part or housing 1, which is tubular, and extended by a tubular extension sleeve 1a. An inner shaft 2 is guidingly received within a bore of housing 1 for motion relative to telescoping shaft-housing 1 and for engagement therewith in the direction of rotation. Inner shaft 2 comprises two separate shaft parts designated a first part 2a and a second part 2b. The housing 1 and shaft part 2b are each provided at one end, in a manner known per se, with a universal joint 3,4. The universal joints 3,4 are detachable, for example, through screw connection with the shaft parts, to facilitate the mounting and dismounting of the shaft. The left end of tubular housing 1 is closed by a bottom 5 which carries a stud 6 to which universal joint 3 is secured. Bottom 5 may be formed with stud 6 as a single piece, for example, through a weld 30.

A ball bearing 7 is provided on the outer end portion of shaft part 2a for axially guiding and holding part 2a in coupling engagement. The guidance and torque transmission are effected in a manner known per se, through balls 8 rolling between the outer and inner shaft parts, which are received in race grooves 9, 10 formed on the circumferential surfaces of shaft housing 1 and part 2a. Grooves 9 extend the entire length of outer shaft part 1 and extension sleeve 1a, so that in a first phase of extension, inner shaft 2 can be pulled up to the end of the sleeve.

The inner shaft 2 is concentrically surrounded by another shaft part, a guide tube 11, at shaft part 2b, which is received in outer shaft part 1. The axial guidance is ensured by a splined surface portion 12 of shaft part 2b engaging corresponding lands or grooves 13 provided on the inner circumferential surface of guide tube 11. Guide tube 11 is firmly connected, at one end, to first shaft part 2a by, for example, a snap ring 14, and is supported by its other extremity at the end of tubular sleeve 1a of the outer shaft part 1 by a bearing ring 15. The bearing ring 15 is preferably composed of an elastic material carrying a gasket 16 and held in place by a thrust ring 17.

The inner shaft part 2b, in turn, is supported in guide tube 11 by means of slide friction means in the form of an elastic ring 18. The elastic ring 18 is secured inside the end portion of guide tube 11 by means of thrust rings 19, 20 and serves, at the same time as a seal. Ring 18 is made of elastic material that is prestressed in order to increase the sliding friction between the ring and shaft part 2b. To prevent a hard butting of shaft part 2a against bottom 5 of outer shaft part 1 upon retracting the shaft, a compression spring 22 is provided between bottom 5 and a protective cap 21 covering bearing 7.

The higher sliding friction produced between shaft part 2b and ring 18, by the prestressing of the elastic ring, is needed to ensure that during the steering, only the ball-bearing telescopic section with its rolling friction becomes effective, while the sliding telescopic section remains in its rest position relative to guide tube 11. The sliding telescopic function comes into effect only after bearing 7 is displaced to abut against bearing ring 15 whereupon shaft part 2b may further be pulled out of guide tube 11 to permit for example, a complete tilting of the driver's cab. While tilting the cab back into its initial position, the universal joint shaft is retracted in the reverse order of operations, i.e., first, shaft part 2a is pushed inwardly until spring 22 is sufficiently compressed to overcome the sliding friction between ring 18 and shaft part 2b, whereupon the sliding telescopic part is pushed into its initial position. The wide telescoping range of the universal joint is indicated in the drawing at A and B. A is the rolling friction range of the ball-bearing telescopic section and B is the sliding friction range of the sliding telescopic section so that A plus B represent the total telescoping capability.

Figure 2:
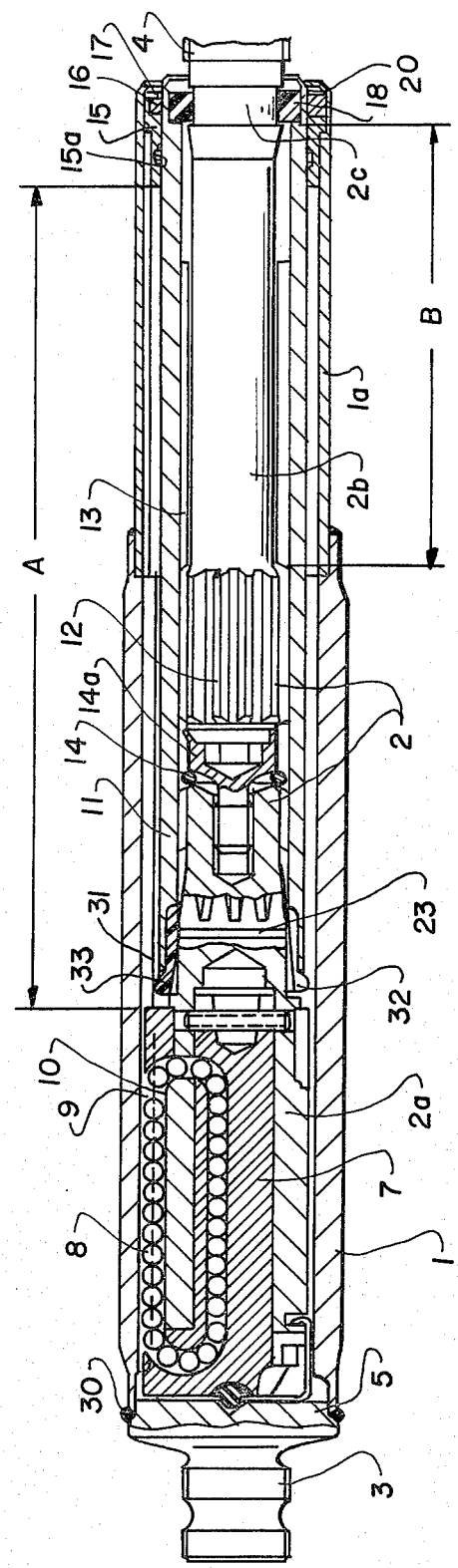

In the embodiment of FIG. 2, shaft 2b is provided with a groove 2c into which ring 18 engages when the shaft is in its steering position. The guide tube 11 is firmly connected at one end to shaft part 2a to which it is secured, for example, by snap ring 14 and a screw 14a. Inner shaft part 2b thus becomes completely locked against unintentional shifting relative to shaft parts 2a and guide tube 11. In this embodiment, there is no need for prestressing the ring 18 with the intention of increasing its sliding friction on shaft part 2b, and such a measure may be provided only as an occasional expedient in particular applications.

Ring 18 in groove 2c thus forms releasable locking means between second shaft portion 2b and guide tube 11. Shaft part 2a carrying ball bearing 7 and guide tube 11 are locked to each other by means of a resilient sleeve-like ring 31 which is received as an insert on the end of guide tube 11, adjacent the ball-bearing 7, and held in place on a shoulder of the tube wall by a snap ring 23. Ring 31 is preferably made of an elastic plastic material and advantageously provided with longitudinal slots 32 to facilitate its snapping into bearing ring 15. On its free end, ring 31 is provided with a raised portion such as a beaded rim 33 which, as the shaft is being extended, snaps into a circular groove 15a formed in the inner face of bearing ring 15 to lock the united shaft part 2a and guide tube 11 against displacement. Up to this phase of extension, shaft part 2b, in its function as a sliding telescopic section, remains locked by sealing ring 18 engaging a groove 2c.

Shaft part 2b can be withdrawn farther upon overcoming the resistance exerted by the elastic material of ring 18. To retract the shaft parts into their initial positions, shaft part 2b is pushed in first, until ring 18 snaps into groove 2c again. Up to this phase of retraction, shaft part 2a and guide tube 11 remain locked by ring 31 and bearing ring 15 against returning to their initial positions. Only upon a further push can this lock be overcome so that shaft part 2a and guide tube 11 are also retracted.

The embodiment of FIG. 2 ensures, during the extension and retraction that the shaft parts will be displaced in accordance with their predetermined range of motion. During steering, only the ball bearing telescopic section with its rolling friction becomes effective, while the sliding telescopic section is securely held in its rest position relative to guide tube 11. The sliding telescopic section becomes effective only if shaft part 2a and guide tube 11 are locked at bearing ring 15 of the guide tube, i.e., only then can shaft part 2b be disengaged from its locking position and pulled farther, in order to completely extend the shaft. After tilting the driver's cab back into its initial position, the universal joint shaft is retracted. To this end, shaft part 2b is pushed in and locked. Then, upon disengaging shaft part 3a and guide tube 11 from outer shaft part 1, all the shaft parts can be returned to their initial positions.

The sequence of operations, as described in the above example is not mandatory. For example, the shaft parts may also be retracted by first pushing in shaft part 2a and guide tube 11 and then shaft part 2b. The sequential order depends on the design and dimensioning of the elastic elements causing the locking. In the shown example, rings 31 and 18 are so arranged and designed that ring 18 opposes a smaller resistance to the motion of shaft part 2b than ring 31 does with respect to shaft part 2a and guide tube 11 so that during a retraction of the universal joint shaft, shaft part 2b is pushed in first, until ring 18 snaps in. Then shaft part 2a and guide tube 11 can be unlocked and pushed in. The ranges of motion obtained with the inventive design are shown in the drawing by dimension lines, A indicating the range of motion of the ball-bearing telescopic section and B indicating the range of motion of the sliding telescopic section, and A plus B being the total range of extension.

While specific embodiments of the invention have been shown and described in detail to illustrate the application of the principles of the invention, it will be understood that the invention may be embodied otherwise without departing from such principles.

What is claimed is:

1. A universal joint shaft, particularly for a steering column of a motor vehicle, comprising a tubular outer shaft, a tubular inner shaft slidably mounted in said outer shaft for axial telescoping movement realative to said outer shaft and engageable for rotation therewith, bearing means between said inner and outer shafts, guide means between said inner and outer shafts for guiding said inner shaft relative to said outer shaft and transmitting torque between said inner and outer shafts, said guide means comprising a tubular guide tube, said inner shaft comprising two separate shaft portions concentrically received in said guide tube, said bearing means being connected to a first one of said shaft portions and the second one of said shaft portions being axially displaceable in said guide tube, and slide friction means engaged between said second one of said shaft portions and said guide tube for resisting axial motion therebetween.

2. The universal joint shaft as set forth in claim 1, wherein said inner shaft includes a splined portion engageable with said guide tube.

3. The universal joint shaft as set forth in claim 1, wherein said guide tube is fixedly connected at a first end to said first one of said shaft portions and slidably mounted to said outer shaft at an opposite second end.

4. The universal joint shaft as set forth in claim 3, further comprising means for elastically supporting said second end of said guide tube and circumferentially sealing the space between said guide tube and said outer shaft.

5. The universal joint shaft as set forth in claim 4, wherein said support means comprises a seal ring of a prestressed elastic material.

6. The universal joint shaft as set forth in claim 5, further comprising spring means mounted to said bearing means and said outer shaft for biasing the bearing means and outer shaft relative to each other.

7. The universal joint shaft as set forth in claim 1, wherein said inner shaft includes a splined portion engageable with said guide means.

8. The universal joint shaft as set forth in claim 1, further comprising means for releasably locking said guide means relative to said outer shaft.

9. The universal joint shaft as set forth in claim 8, wherein said slide friction means comprises an elastic ring connected to said guide tube and engaged against said second one of said shaft portion, said means for releasably locking said guide tube comprising a groove defined in said second one of said shaft portions for receiving said elastic ring.

10. The universal joint shaft as set forth in claim 1, further comprising means for locking said guide tube to said outer shaft.

11. The universal joint shaft as set forth in claim 10, wherein said locking means comprises a bearing ring mounted intermediate said guide tube and said outer shaft, a resilient ring operatively inteconnecting said first and second ones of said shaft portions, and at least one of said resilient ring and said bearing ring including means detachably connecting said resilient ring to said bearing ring.

12. The universal joint shaft as set forth in claim 11, wherein said connecting means includes a raised portion formed on said resilient ring and said bearing ring includes a circular groove for receiving said raised portion.

13. The universal joint shaft as set forth in claim 12, wherein said resilient ring is an elastomer, and includes one or more longitudinal slots extending from said raised portion.

14. The universal joint shaft as set forth in claim 13 wherein said second one of said shaft portions includes a circumferential groove for fittingly receiving said bearing ring.

15. The universal joint shaft, as set forth in claim 14 wherein said slide friction means comprises an elastic ring connected to said guide tube and engaged against said second one of said shaft portion.

16. The universal joint shaft as set forth in claim 15, wherein said elastic ring is prestressed against said second one of said shaft portion.

* * * * *